Aug. 26, 1952 W. H. ZINN 2,608,661
MEANS FOR MEASURING RADIATION
Filed Oct. 16, 1945
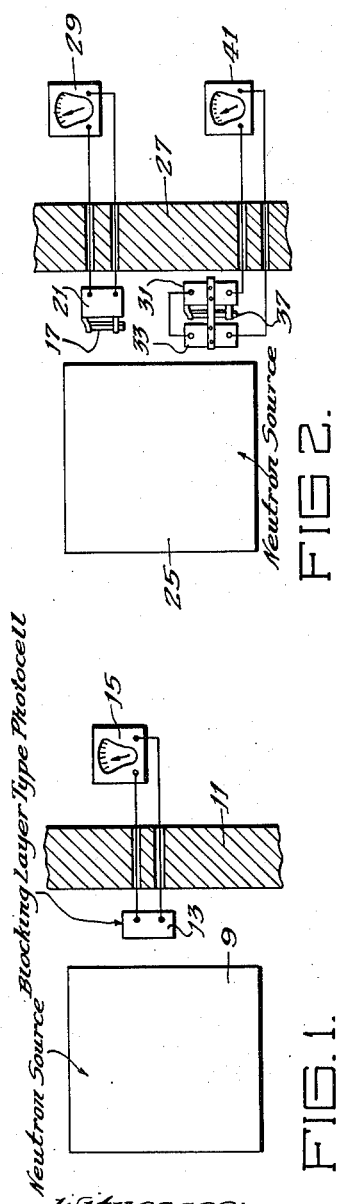
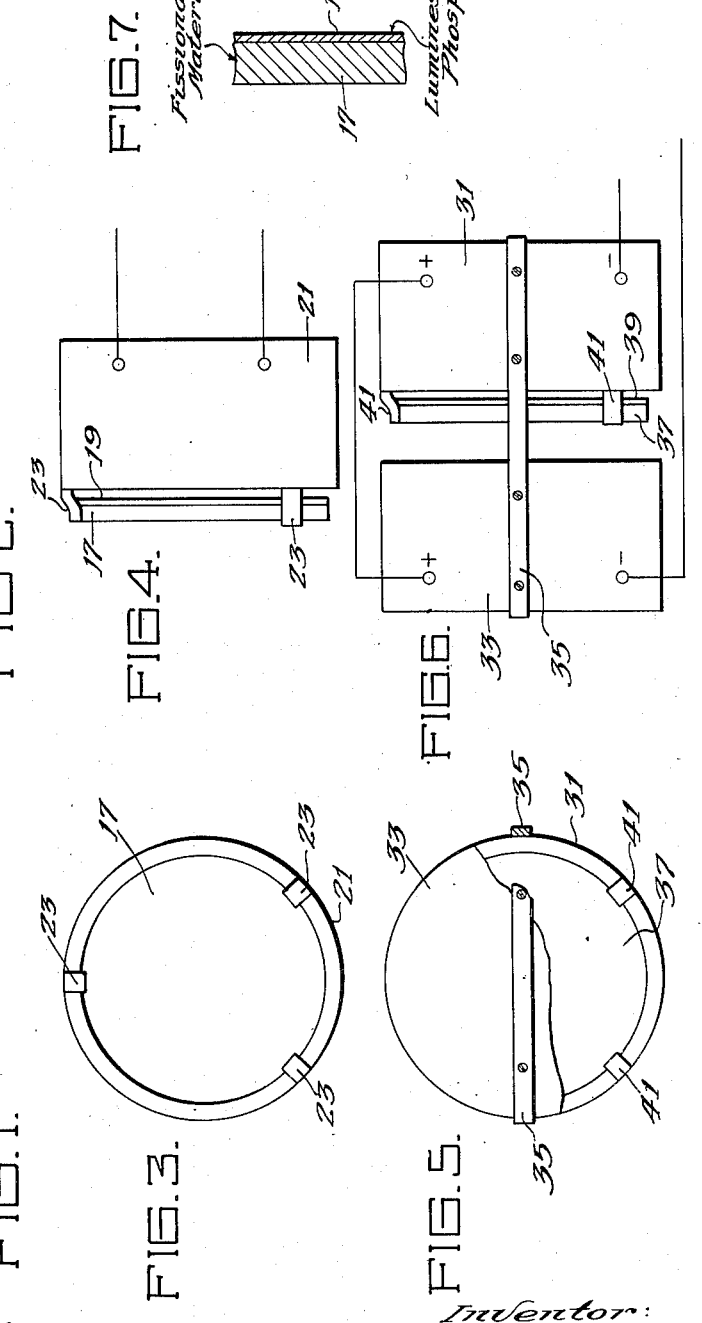
Inventor:
Walter H. Zinn
By Robert A. Lavender
Attorney Patented Aug. 26, 1952

2,608,661

UNITED STATES PATENT OFFICE 2,608,661

MEANS FOR MEASURING RADIATION

Walter H. Zinn, Chicago, Ill., assignor to the United States of America as represented by the United States Atomic Energy Commission Application October 16, 1945, Serial No. 622,631

5 Claims. (Cl. 250—71)

The present invention relates to neutron responsive devices, and particularly to neutron density indicating means adapted for use in connection with the control and operation of neutronic reactor systems.

A neutronic reactor system, as the term is used herein, constitutes a complete system designed for initiating and carrying out chain nuclear reactions. Such systems include a neutronic reactor wherein neutrons are developed and reserved for sustaining the reaction, control apparatus for initiating and controlling the progress of the reaction, and shielding means for protecting the operating personnel from the radiations developed during the operation of the system. In general, the power being developed in a neutronic reactor system at any particular instant is proportional to the neutron density existing at that particular time within the reactor unit. Neutron density is, therefore, a convenient basis for the instrumentation and operational control of neutronic reactor systems. As a result, a very considerable amount of work has been done with a view toward developing simple, accurate, and reliable devices operable to provide continuous indication of neutron density within, or adjacent to, a neutronic reactor, but all of the problems in connection with the provision of a completely satisfactory device of this type have not been solved. The present invention is directed toward the solution of certain of these problems and has for its object the provision of an improved novel neutron density indicating means.

As will hereinafter appear, this object is accomplished through the utilization of the present discovery that photovoltaic cells, or blocking layer type photocells, or blocking layer rectifiers as they are more commonly designated, have the peculiar property of exhibiting a voltaic effect when subjected to neutron irradiation, the intensity of the voltaic effect being substantially proportional, within reasonable limits, to the density of the neutron radiation which produces that effect. This discovery makes possible an improved, direct reading type, neutron intensity indicator. Also, when this discovery is combined with the inventive concept disclosed in my co-pending application, Serial No. 595,187, filed May 22, 1945, that certain combinations of fissionable material and fluorescent or phosphorescent materials will produce luminescence when exposed to neutron irradiation, certain other novel neutron density indicating devices which have particular advantages are made possible. The novel features of the various types of improved density indicating devices of the present invention will be made more apparent in the following description and accompanying drawings of certain embodiments thereof. In the drawings:

Fig. 1 is a diagrammatic view illustrating a neutron density indicating means, in accordance with the basic discovery of the present invention, in combination with a neutronic reactor or other source of neutron radiation;

Fig. 2 is a diagrammatic view, similar to Fig. 1, illustrating two other types of neutron density indicating means embodying features of the present invention;

Figs. 3 and 4 are plan and side elevational views, respectively, of the neutron responsive exploratory unit of one of the indicating means illustrated in Fig. 2;

Figs. 5 and 6 are views similar to Figs. 3 and 4 of the exploratory unit of the other indicating means illustrated in Fig. 2; and Fig. 7 is a fragmentary sectional view of the neutron responsive luminescence element forming a part of the exploratory units shown in Figs. 2 through 6.

As previously stated, the improved neutron density indicating devices of the present invention are predicated upon the discovery that a blocking layer photovoltaic, or rectifying type cell, will be activated to produce a voltage across the terminals thereof when subjected to neutron irradiation. This voltage is substantially proportional to the density of the neutron radiation and is of an order of magnitude comparable to that produced by the electric effect induced when such a photovoltaic cell is activated by light energy at ordinary illumination levels. In its simplest form, the improved neutron density indicating means of the present invention comprises a blocking layer type photocell or rectifier, of either the back effect type or of the front effect type, which is connected to a suitable indicating means, such as a microammeter, galvanometer, or the like.

An embodiment of this form of the invention is illustrated diagrammatically in Fig. 1. In that figure, a source of neutrons, such as a neutronic reactor, is indicated at 9. A portion of the protective shield which normally encloses devices of this character, in order to protect the operating personnel from the radiations developed during the operation thereof, is indicated at 11. Within the shield 11 and in a position to receive neutron irradiation from the reactor or other source 9, there is provided a neutron responsive exploratory unit preferably consisting of a photovoltaic or blocking layer type photocell 13. The output terminals of the photocell 13 are connected to an indicating means 15 of conventional type. When the photocell exploratory unit 13 is subjected to neutron irradiation, the indicating means 15 will be energized to produce a reading which is substantially proportional to the density of the radiation, and the complete indicating system is, therefore, susceptible of easy and convenient calibration in terms of neutron density.

So far as present investigations have shown, all known types of photovoltaic or blocking layer type cells exhibit a voltaic response to neutron irradiation. Particularly satisfactory results have been noted when using a back effect cell of the well-known copper-cuprous oxide type. Very good results have also been had with a silver-selenide type back effect cell. Almost equally satisfactory results can be obtained by the use of front effect cells, particularly the copper-cuprous oxide cell which utilizes a sputtered film of gold, silver, or platinum applied to the normally exposed cuprous oxide layer for obtaining the front effect.

In certain instances the response of a neutron density indicating means which depends solely upon the voltaic effect resulting from the irradiation of a blocking layer exploratory unit may not be as great as might be desired. This is particularly true when the exploratory unit must be located in a place where the neutron intensity is relatively low. It is possible in these instances to augment the response of the exploratory unit when photovoltaic cells are used by combining therewith a means which becomes luminescent when subjected to neutron irradiation. Such a means is disclosed and described in the aforesaid co-pending application, and in its simplest form constitutes a sheet or disc of uranium metal, or other fissionable material, which is coated on one side with a thin layer of a phosphor, such as zinc sulphide. This combination of materials has the property that the radiations emitted by the radioactive fission processes resulting from fissions induced in the uranium by neutron irradiation thereof will produce fluorescent luminescence in the phosphor coating.

A combination type indicating means embodying a luminescent unit of this general type is illustrated in Figs. 2, 3 and 4. The exploratory unit of the illustrated structure includes a disc 17 of uranium metal having a phosphor coating 19 applied to one side thereof (see Fig. 7), and the coated disc 17 is supported on a blocking layer photocell 21, by suitable supports 23, in such manner that the induced luminescence will activate the photocell.

In use, this combination type exploratory unit is placed adjacent a neutronic reactor or other neutron source 25, usually at the inner side of the protective shield 27, as illustrated in Fig. 2, and the output terminals of the photocell portion 21 of the exploratory unit are connected to a suitable indicating means 29, which may be a galvanometer type instrument. This combination structure, as previously stated, is of particular value in obtaining rather large responses for relatively small neutron densities. It will be appreciated, however, that the ultimate capacity of such a device is more limited than a neutron indicating means which employs a blocking layer type voltaic cell alone as the exploratory element, or one which utilizes a means which fluoresces when exposed to neutron irradiation in combination with a photocell which is not of itself energized or excited by neutron irradiation. Saturation of the photocell will be reached at much lower neutron densities when the combined response arrangement is used.

In certain instances it is advantageous to utilize an exploratory unit which includes means which fluoresce when exposed to neutron irradiation in combination with a blocking layer type photocell. In those instances, it is possible to eliminate the voltaic effect resulting from neutron irradiation of the photocell portion of the exploratory unit and to cause the response of the device to be determined solely upon luminescence effect. This is done by utilizing an exploratory unit which comprises two photocells in combination with a fluorescent type neutron responsive element, the two photocells being connected electrically in opposition and only one of the photocells being arranged to be activated by the fluorescence induced in the fluorescent element.

One suitable structure of this latter type is illustrated in Figs. 2, 5, and 6 of the drawings. The illustrated apparatus includes an exploratory unit which consists of two, similar, blocking layer type photocells 31 and 33 supported in face to face relationship by a suitable support member 35 and having a disc 37 of uranium metal, coated on one side with a thin layer 39 of a fluorescent phosphor supported between the two photocells by spaced support arms 41. The uranium disc 37 is similar in construction to the disc 17 previously described, and the phosphor coating 39, similarly to the coating 19, is capable of fluorescing when exposed to the radiations developed by fission products in the uranium portion of the disc. The two photocells are connected electrically in series opposition to each other, as illustrated in Fig. 6, and the output from the interconnected cells is conducted to a suitable indicating means 41. It will be apparent that when an exploratory unit of this type is placed within or adjacent to a neutronic reactor 25 or other source of neutrons, as illustrated in Fig. 2, the output of the exploratory unit will be determined solely by the luminescence induced in the phosphor coating 39 of the uranium disc 37. The voltaic effect induced in the two photovoltaic cells 31 and 33 by neutron irradiation thereof will balance out.

In the foregoing there have been disclosed the features of certain new and improved neutron density indicating means. The disclosed indicating devices are all made possible by the present discovery of the voltaic effect which results when blocking layer type cells are subjected to neutron irradiation. Specific examples of the general types of devices embodying this discovery have been disclosed. It will be understood, however, that the disclosed devices are merely illustrative, and that variations in the specific constructional arrangements and circuit details are within the contemplation of the invention. The features of the invention which are believed to be new are expressly pointed out in the appended claims.

What is claimed is:

1. Neutron density indicating means comprising a pair of blocking layer type photocells connected in series opposition relationship, means which becomes luminescent when subjected to neutron irradiation positioned to activate one only of said photocells, and electrical indicating means connected to said series connected photocells.

2. Neutron density indicating means comprising a pair of blocking layer type photocells connected in series opposition relationship, means which becomes luminescent when subjected to neutron irradiation positioned to activate one only of said photocells, said luminescent means comprising a member of a fissionable material which is coated with a layer of a material which becomes luminescent when subjected to the radiations produced by fission products, and electrical indicating means connected to said series connected photocells.

3. Neutron density indicating means comprising a pair of blocking layer type photocells connected in series opposition relationship, means which becomes luminescent when subjected to neutron irradiation positioned to activate one only of said photocells, said luminescent means comprising a thin sheet of uranium metal which is coated with a layer of a material which becomes luminescent when subjected to the radiations produced by the products of fission induced in the uranium by neutron irradiation thereof, and electrical indicating means connected to said series connected photocells.

4. An exploratory unit for use in connection with neutron density indicating means of the class described comprising a pair of blocking layer type photocells connected in series opposition and disposed in face to face relationship with a neutron responsive, luminescent means interposed therebetween, said luminescent means comprising a sheet of fissionable material which is coated on one side thereof with material which becomes luminescent when subjected to the radiations produced by the products of fissions induced in said fissionable material by neutron irradiation thereof, and the positioning of said luminescent means being such that one only of said photocells is photovoltaically activated by luminescence induced therein.

5. An exploratory unit for use in connection with neutron density indicating means of the class described comprising a pair of blocking layer type photocells connected in series opposition and disposed in face to face relationship with a neutron responsive, luminescent means interposed therebetween, said luminescent means comprising a sheet of uranium metal which is coated on one side thereof with material which becomes luminescent when subjected to the radiations produced by the products of fissions induced in said uranium upon neutron irradiation thereof, and the positioning of said coated uranium sheet being such that one only of said photocells is photovoltaically activated by luminescence induced therein.

WALTER H. ZINN.

REFERENCES CITED

The following references are of record in the file of this patent:

UNITED STATES PATENTS

| Number | Name | Date |
| --- | --- | --- |
| 2,066,611 | Christy | Jan. 5, 1937 |
| 2,190,200 | Victoreen | Feb. 13, 1940 |
| 2,200,853 | Porter et al. | May 14, 1940 |
| 2,220,509 | Brons | Nov. 5, 1940 |
| 2,259,372 | Geisler | Oct. 14, 1941 |
| 2,303,709 | Siegert | Dec. 1, 1942 |
| 2,305,452 | Kallmann et al. | Dec. 15, 1942 |
| 2,344,042 | Kallmann et al. | Mar. 14, 1944 |
| 2,344,043 | Kallmann et al. | Mar. 14, 1944 |
| 2,408,230 | Shoupp | Sept. 24, 1946 |